United States Patent [19]
Foehse

[11] Patent Number: 5,063,078
[45] Date of Patent: Nov. 5, 1991

[54] METHOD OF DRY MILLING AND PREPARING HIGH SOLUBLE FIBER BARLEY FRACTION

[75] Inventor: Karen B. Foehse, Plymouth, Minn.

[73] Assignee: General Mills, Inc., Minneapolis, Minn.

[21] Appl. No.: 437,229

[22] Filed: Nov. 16, 1989

[51] Int. Cl.$^5$ .............................................. B02C 7/00
[52] U.S. Cl. ................................. 426/618; 426/482; 426/518
[58] Field of Search ..................... 426/618, 482, 518

[56] References Cited

U.S. PATENT DOCUMENTS

| | | | |
|---|---|---|---|
| 3,115,411 | 12/1963 | Shields | 426/481 |
| 4,042,414 | 8/1977 | Goering et al. | 127/32 |
| 4,116,770 | 9/1978 | Goering et al. | 195/63 |
| 4,804,545 | 1/1981 | Goering et al. | 426/28 |
| 4,311,714 | 1/1982 | Goering et al. | 426/28 |
| 4,428,967 | 1/1984 | Goering et al. | 426/28 |
| 4,497,840 | 2/1985 | Gould et al. | 426/560 |
| 4,620,981 | 11/1986 | Gordon et al. | 426/448 |

OTHER PUBLICATIONS

Large-Scale Preparation and Properties of Oat Fractions Enriched in (1-3) (1→4)-β-D-Glucan; Wood et al.; Cereal Chemist 66(2) 1989, No. 97–103.
Protein Concentrates from Oat Flours by Air Classification; Wen et al., Cereal Chemistry 1973, vol. 50, No. 2, No. 492.
Prepared Foods, Mar. 1989, No. 91.
The Hypocholesterolemic Function of Barley β-Glucans.

*Primary Examiner*—Donald E. Czaja
*Assistant Examiner*—Mary S. Mims
*Attorney, Agent, or Firm*—John A. O'Toole

[57] ABSTRACT

Disclosed are barley flour fractions having concentrated levels of soluble dietary fiber ("SDF"). The barley flour fractions have SDF contents ranging from about 18% to 30%. Also disclosed are dry milling concentration methods for making the high soluble dietary fiber content barley flour fractions. The milling methods involve size reducing a barley flour, especially a 70% to 80% extraction flour, having a native SDF level to a controlled particle size distribution to form a size reduced flour. This is accomplished by a single pass pinmilling step followed by particle size classification at an opening of 30–60 microns to separate the size reduced flour into a starchy fraction and the present barley flour fraction having a 1.2X–5X concentration of SDF compared to the native SDF level.

10 Claims, 1 Drawing Sheet

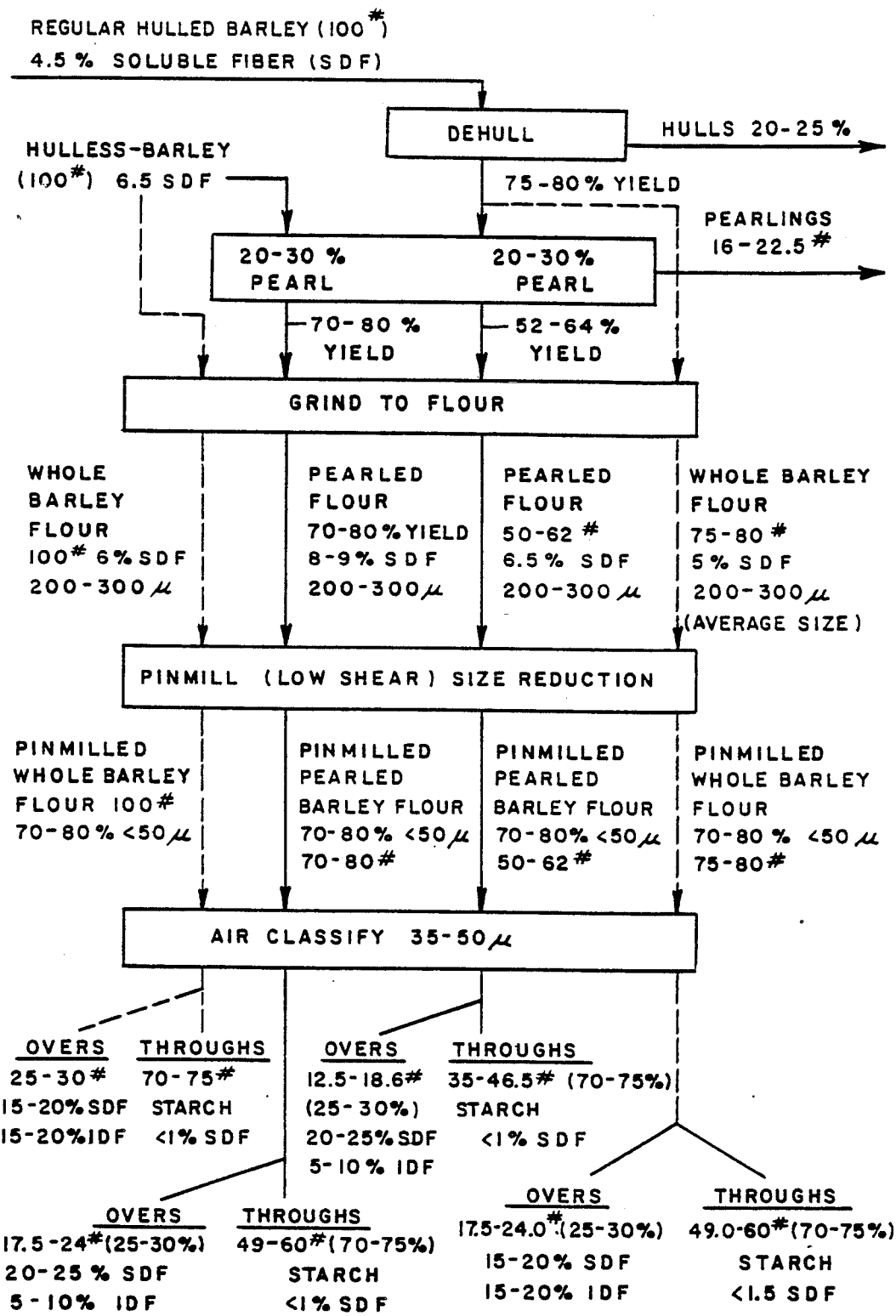

5,063,078

METHOD OF DRY MILLING AND PREPARING HIGH SOLUBLE FIBER BARLEY FRACTION

1. FIELD OF THE INVENTION

The present invention relates to food products and to their methods of preparation. More particularly, the present invention relates to barley fractions or products and to dry milling methods for their preparation.

2. BACKGROUND

There is growing awareness of the health benefits to people associated with soluble fiber consumption, especially reductions in blood serum cholesterol, i.e., antihypercholesterolemic benefits. Total dietary fiber ("TDF") comprises both soluble dietary fiber ("SDF") and insoluble dietary fiber ("IDF"). In addition to insoluble fiber, certain whole grain cereal flours contain soluble fiber which predominantly comprises beta glucans. Oats and barley are well known as having relatively high levels of soluble fiber. The SDF content of oat flour ranges from about 3% to 7% depending upon such factors as variety, yield/season, source, etc. The SDF in oats is selectively concentrated in the outermost part of the endosperm close to the bran. Because of this, the oat bran fraction is relatively higher in soluble fiber concentration than whole oats and can range from about 5% to 8%. For this reason, oat bran consumption is enjoying immense and growing popularity. Oat bran is commonly added as a minor constituent to a wide variety of foods and as a major or principal component of various cereal products, both hot cereals and ready-to-eat ("R-T-E") cereals. See U.S. Pat. No. 4,497,840 (issued Feb. 5, 1985 to Gould et al.) entitled Cereal Foods Made From Oats and Method of Making. The art also includes methods for diluting the beta glucan content of oat flour (see U.S. Pat. No. 4,620,981 entitled Process for Preparing a Highly Expanded Oat Cereal Product, issued Nov. 4, 1986 to Gordon et al.). Unfortunately, due to the sudden increase in popularity, oat bran availability is tight and prices are high.

In view of the availability and price of oat bran, it would be desirable to have an alternate concentrated source of soluble flour to oat bran. At present, psyllium seed husk flour (about 85% soluble fiber) has been suggested for use as a soluble fiber additive for a large number of food products. While useful, psyllium is also expensive. Moreover, psyllium is an imported foodstuff. It would be desirable to have a source of concentrated soluble fiber from a domestic or common dried grain, such as barley.

The soluble fiber content of barley is roughly comparable to that of oats and ranges from about 3% to 7%, again depending upon such factors as variety, etc. However, in contrast to oats wherein the oat bran fraction is distinctly higher in soluble fiber, barley bran is not. The soluble fiber distribution in barley is more complex. Barley soluble fiber is concentrated in the cell walls of the endosperm, however, the soluble fiber distribution is more uniform throughout the barley endosperm or grain relative to the soluble fiber distribution in oats. Thus, unlike oat bran, barley bran is not usefully higher in soluble fiber content. Unfortunately then, due to these and other differences between grains, the art's teaching regarding milling and especially oat milling generally fails to provide methods for preparing barley fractions relatively richer (i.e., greater than about 7%) in soluble fiber content. Methods and techniques useful in processing other cereal grains provide little actual useful guidance in this respect due to the distinctive nature of barley.

The prior art, however, does include teachings on one known barley processing method to provide a purified beta glucan content barley fraction. This known processing method involves a wet processing method and is described in U.S. Pat. No. 4,804,545 entitled Production of Beta Glucan Bran, Protein, Oil and Maltose Syrup from Waxy Barley (issued Feb. 14, 1989 to Goering et al.). The wet processing techniques therein described involve improvements in wet barley processing methods described in U.S. Pat. Nos. 4,311,714 and 4,428,967. The improvements reside in a water extraction of the beta glucan from barley flour and involves a sequence of centrifugation steps and further dehydration steps. An advantage of this wet system is that a fraction can be obtained which is very high in its beta glucan content, i.e., is purified as compared to merely concentrating as in the present invention. Unfortunately, the wet milling process has multiple disadvantages. First, the process is complex, and thus both expensive and capital intensive. Due to its highly viscous nature, dehydration steps are especially difficult and energy intensive. Also, no commercial facility now exists which can practice the process on a commercial scale; that is, the method cannot be used with existing milling equipment. Finally, yields are low.

Surprisingly, the present invention overcomes the above disadvantages and provides methods for preparing a concentrated source of barley beta glucan. The present methods comprise dry milling techniques which thus can be practiced at many commercial barley milling facilities. Thus, the present methods provide the surprising benefits of being simple, inexpensive, low energy intensive and do not require construction of new, special purpose commercial facilities. Still another advantage of the present methods is that they can be quickly implemented at existing facilities and so can be used to reduce the present oat bran supply shortage.

The present invention resides in part in the realization that the beta glucan constituent can be separated from barley flour if the barley flour has been sufficiently, but not excessively, size reduced without high shear (e.g., pinmilling) followed by selectively air classifying or sieve screening of the pinmilled barley flour.

It is an advantage of the present invention that all barley varieties can be used, including those more widely available, such as malting barley varieties even though such varieties are low in native SDF.

SUMMARY OF THE INVENTION

In its product aspect, the present invention resides in barley flour fractions characterized by a concentration of soluble dietary fiber. The SDF concentration can be 1.2× to 5× the native concentration in whole barley flour, e.g., SDF levels of about 10% to 25%. The barley flour can be either whole or white flour. The barley flour fraction is further characterized by a particle size such that about 90% is greater than about 90 microns ("$\mu$").

In its process aspect, the present invention resides in dry milling methods for the preparation of the present barley flour fraction having concentrated SDF levels.

Most broadly, the method involves a first step of size reducing a barley flour having a native SDF level to a controlled particle size range such as by pinmilling.

Thereafter, the size reduced barley flour is separated into a starchy fraction and the present high SDF barley flour fraction.

BRIEF DESCRIPTION OF THE DRAWINGS

FIG. 1 is a schematic flow diagram for one embodiment of the present barley dry milling method(s) of preparation.

DETAILED DESCRIPTION OF THE INVENTION

The present invention relates to a barley flour fraction having a concentrated soluble dietary fiber content and to dry milling methods for the preparation of such barley flour fractions. Each of the essential milling steps are described below in detail.

Throughout the specification and claims, temperatures are in degrees Fahrenheit and percentages are by weight, unless otherwise indicated.

Barley is well known and widely used as a grain commodity. The term "barley" in the singular form is used herein to refer to kernels or corns in a manner similar to "wheat" or "corn." In the U.S., barley is grown for two principal end uses and one minor end use. First, barley is grown as an animal feed in those regions less suitable for growing field corn or other animal feed grains. Second, barley is grown for use in the alcoholic beverage industry. As has been long known, upon sprouting or malting, barley develops enzymes which can convert starch to sugars. The resultant sugars can be converted to alcohol by yeast fermentation. Barley is also grown for the minor use for direct human consumption. Less than 1% of U.S. barley production is used for direct human consumption.

A wide variety of cultivars of barley are known. While all manner of barley varieties can be used herein, some barley varieties are preferred. For example, some cultivars are relatively high in soluble fiber. Generally, barley varieties high in soluble fiber are considered to be undesirable especially in the alcoholic beverage industry since such barley varieties are more prone towards the problem of clouding in beer production. As a result, the widely available malting barley varieties are generally relatively low in SDF. In contrast, these high SDF barley varieties are generally preferred for use herein.

In another attribute variation, both hull-less barley and covered barley, i.e., having a hull, are known and each can be used herein. Hull-less varieties are sometimes referred to as "nude" and their variety names often contain the syllable "-nu-", e.g., Nupana. If covered barley is employed, however, the barley is preferably initially dehulled to provide a dehulled barley kernel (technically referred to as the caryopis). The caryopis comprises, roughly from exterior inwardly, the pericarp and seed coat (which collectively are loosely referred to as the bran), germ and endosperm. The endosperm is the largest portion and contains the starchy material. While hull-less barley is preferred from an ease of processing standpoint, it is relatively uncommon. Thus, from cost and availability standpoints, regular hulled barley is preferable.

Barley can also be of a regular or waxy variety. These waxy barleys normally contain starch comprising 100% amylopectin. The skilled artisan will appreciate that waxy barleys are usually named with the prefix "wa-" e.g., Watan, Washonutan. The barley variety name will often include a syllable or suffix which identifies the origin variety. For example, a variety which is relatively high in soluble fiber content is the "Betzes" variety which is identified in the barley variety name by containing a syllable "-bet-". Thus, for example, the "Wanubet" is and signifies a waxy, hullless barley derived from the Betzes variety.

In still another variation, certain barley varieties which are high in protein content, i.e., low in starch content, are known. These high protein or low starch varieties also generally are high in native soluble fiber content. While desirable from the standpoint of being able to produce a finished product high in soluble fiber, such varieties are undesirable from the standpoint of cost and availability.

In the preferred embodiment, the dehulled or, equivalently, for use herein, hull-less barley, is desirably pearled. "Pearling" is a term used in the barley milling art to refer to the removal of the outermost portion of the dehulled barley kernel or caryopis. Thus, for example, a "10% pearling" step removes approximately 10% of the outermost portion of the barley kernel. Upon subsequent grinding to form a flour, the resultant flour is referred to as a "90% extraction" flour. Similarly, if the barley pearling step is practiced to a 20% pearling, then approximately 20% of the outermost portion of the barley kernel is removed. Upon milling to a flour, the resultant barley flour is referred to as a "80% extraction" flour. Also useful herein, but less preferred, is whole dehulled barley, i.e., not pearled, and containing the outermost bran and germ fractions.

Pearled barley is preferred as the present starting material since pearled barley is somewhat higher in soluble fiber content. Thus, for example, whole barley (and a flour made therefrom) may have a soluble dietary fiber content of 6%. Since very little soluble fiber is contained in the bran, which contains mostly cellulosic material and other insoluble nonstarch polysaccharides, the pearled barley can be, for example, about 8% soluble dietary fiber. Thus, pearled barley is slightly more concentrated with respect to SDF, about 20% to 30%, or $1.2\times-1.3\times$ relative to the native SDF concentration of whole dehulled or hull-less barley. Preferred for use herein is barley pearled between about 1% to 30%. More preferred for use herein is barley which has been pearled to from about 10% to about 30% and for best results about 20% to 30%. The material removed by the pearling operation is referred to as "pearlings." The pearlings are discarded from the present process and typically also would be used as an animal feed item.

Thereafter, the barley source material (i.e., whole barley flour and/or pearled barley flour) is ground or milled, i.e., size reduced, in a conventional manner to the barley dry milling art to form a flour. Thus, useful herein as the barley source material is whole barley flour and, more preferably, 70% to 90% barley extraction flour. Since commercial barley flour is typically made from cleaned, dehulled, pearled barley, conventional commercial barley flour can be used in full or partial substitution for the preferred 70% to 90% extraction barley flour. The present barley flour obtained by this milling step is characterized by conventional levels of particle size or fineness. Broadly, useful herein are barley flours or meals characterized by a particle size with about 70% distributed between about 15 and 500 microns or 90% less than 600 microns. They are further characterized by having greater than 50% of the particles larger than 200 microns.

In the next essential step of the present dry milling methods, the barley flour is further size reduced with minimal shear to an essential defined particle size range. It has been surprisingly discovered that if barley flour is size reduced in the described manner, then the size reduced material can be easily separated subsequently by defined flour separation techniques employing conventional milling apparatus into a starchy fraction and a high SDF fraction. While not wishing to be bound by the proposed theory, it is speculated herein that the soluble dietary fiber content is associated primarily with the cell walls in the cells which comprise the remaining barley endosperm. However, in percentage terms, most of the material remaining after removal of the outer hull and germ layers is the starch component. The starch component is in the form of starch granules embedded in a protein matrix within the individual endosperm cells. It is believed that the present controlled, defined size reduction step accomplishes disruption of these cells which frees or disassociates the relatively smaller but more numerous starch granules from the relatively larger but less numerous cell wall pieces. Due to size and other physical property differences (e.g., density, shape, etc.) between the starch granule particles and cell wall particles, the particles can be separated.

In the present size reduction step, the barley flour is preferably size reduced such that about 30% to 80% of the size reduced material is less than about 50 microns. However, if the size reduction step is carried forward too far, the subsequent separation steps will be relatively ineffective because the relatively larger cell wall particles are reduced in size to be equivalent to the starch granules. Excessive size reduction is evident when greater than about 70% of the size reduced flour is less than about 30 microns in size or when greater than 90% of the size reduced flour is less than 50 microns which indicates that the cell walls have been reduced in size to equivalence in size to the starch granules.

Particularly useful herein for practicing the essential size reduction step is conventional milling apparatus generally referred to as pinmills; however, other size reduction equipment well known to one knowledgeable in the art can also be used to perform the size reduction step. As is well known in the milling art, pinmills comprise two flat counter-rotating disks. Each disk contains metal pins that protrude at 90 degree angles from the disk face. The pins on each disk intermesh. When the mill is turned on, disks rotate at high speed. Flour fed into the mills falls between the disks and is impacted by the metal pins. The specific action of a pinmill on flour particles is to reduce particle size without high shear.

As described above, pinmilling serves to break starch granules from protein in the flour without severely damaging the physical integrity of those flour components. When pinmilling is used to practice the present size reduction technique the correct speed on the pinmills has been found to be important for reducing the flour particle size sufficiently to enhance later separation by air classification. (Pinmill speed, of course, is calculated by multiplying the disk diameter time, times rotational speed.) When the pinmill speed was set too low, the flour particles obtained were too large. Subsequent air classification of the flour with large particles did not provide a good separation of flour components. That is, the SDF was not well concentrated in one fraction, but was either distributed in both fractions or was poorly concentrated in one fraction. Also, subjecting the one pass pinmilled flour to a second pinmill step failed to realize a size reduced flour capable of subsequent fractionation and in fact can be detrimental to subsequent separation steps. When the pinmill speed was set too high, the size of all the flour particles was reduced to such a small size that a separation was not feasible.

Pinmills rotational or tip speeds conventionally are expressed in units of meter/second. Good results are obtained when tip speeds range from about 140–200 m/s. Better results in terms of higher concentrations of SDF are obtained employing tip speeds of about 170–190 m/s, and for best results, a tip speed of about 180 m/s is selected.

The pinmilled barley flour obtained is importantly characterized by its particle size distribution as described above. Even more highly preferred are size reduced flours having particle size distributions such that about 50% is less than 50 microns.

In the next essential step, the size reduced barley flour is separated into two fractions. The first fraction is the "over" fraction and the second fraction is the "through" fraction. The over fraction is usually smaller in amount and is a barley flour fraction having the concentrated SDF levels. Although smaller in amount, the over fraction is actually larger in particle size. In direct contrast, the through fraction is usually greater in amount but smaller in particle size and is predominantly starch.

Particularly useful herein to practice the present separation or fractionation step on an industrial scale are conventional dry milling air classifiers. Air classifiers are designed to operate on one or more of four separation principles, namely, size, shape, density and behavior of particles in an air stream. Air classifiers operating on any of these principles should be able to be used. However, most useful herein are those designed to operate on the basis of size differences. It is a particularly important advantage of the present invention that conventional apparatus can be employed since equipment design, fabrication and installation delays and expenses can be avoided. On a smaller scale, sieves with air suction can be used to practice the present fractionation step.

In practice, the air classifier has settings which vary the opening size. Good results are obtained when the size settings range from about 28 to 65 microns.

For optimal concentration of SDF in barley flour, it is essential that the separation be done at a particle size slightly greater than the size range of the starch granules in the flour. For barley flour, the optimum separation was obtained at particle size settings that corresponded to 35–50 microns. These settings allowed the maximum amount of a high starch fraction to be removed from the flour without removing the high SDF components. Further, good yields (approximately 30%) of the high SDF fraction can be obtained.

The over barley flour fraction obtained is importantly characterized by a concentration of SDF relative to the barley source material employed as the starting material. Concentrations can range from about $1.2\times$ to $5\times$. When 80% extraction flour is employed having a SDF content of about 8% as the barley source material, then barley fractions ranging in SDF from about 20% to 25% are realized. Yields of the high SDF barley flour fraction of up to about 25% to 35% are obtained with 80% extraction flour from hulless barley. Some trade off exists between higher yields and higher SDF contents. Generally, more than 90% of the over fraction has a particle size greater than about 28–65 microns. Preferably, 90% of the over fraction has a particle size greater than about 90 microns. The over fraction is further characterized by a size distribution such that about 80% is greater than about 95 microns and less than 450 microns. The present, novel over fraction is additionally compositionally characterized as follows:

| Over Fraction | Percent |
| --- | --- |
| Starch | 20 to 45 |
| Protein | 14 to 20 |
| Fat | 2 to 8 |
| Total dietary fiber | 20 to 50 |
| Insoluble dietary fiber | 5 to 25 |

The major or through fraction is characterized by being predominantly the barley starch and is compositionally characterized as follows:

| Through Fraction | Percent |
| --- | --- |
| Starch | 25 to 90 |
| Protein | 8 to 12 |
| Total fiber | <4 |
| Fat | <4 |

Substantially all of fiber, including the SDF, typically remains with the minor over fraction. The through fraction is especially suitable for use in the beer industry since low soluble fiber barley starch materials are less prone to cause clouding of beer.

The high SDF barley flour obtained from the present invention is useful in a wide variety of food products which are desired to be fortified with soluble fibers, including, for example, cookies, biscuits, breads, culinary mixes and especially R-T-E cereals. The present high SDF barley flour behaves generally in such food product applications roughly comparable to other barley flours, but with increased water absorption. Thus, the present invention further resides in grain-based food products comprising additive amounts of the present novel barley flour fractions, e.g., comprising about 1% to 75% of the over barley flour fraction, preferably about 10% to 50% and the balance, the base composition of the food product. Especially preferred herein is an R-T-E cereal piece comprising about 10% to 50% of the high SDF over barley flour fraction.

The following examples illustrate the invention process and high SDF barley fractions obtained therefrom:

EXAMPLE 1

Whole, waxy, hull-less barley was pearled to remove 20% of the outer bran layers from the kernels. The feed rate through the pearling equipment was 700 pounds per hour. The pearled barley contained 8% soluble dietary fiber and 3% insoluble dietary fiber. The pearled barley was ground to a coarse meal using three sets of corrugated roller mills set in series. The meal was then sifted through a U.S. #20 Standard sieve (840 microns) and the overs were recirculated through the process.

The barley meal was delivered to a pinmill at a feed rate of 1160 pounds per hour. The meal was pinmilled at a pinmill speed setting of 180 meters per second to reduce the particle size such that 80% was greater than 5 microns and less than 330 microns. The particle sizes were normally distributed in that range.

The pinmilled flour was separated by air classification into two fractions above and below a specified particle size of 48 microns. The coarse fraction had a particle size distribution such that 80% was greater than 95 microns and less than 450 microns. The coarse fraction was further characterized by having an analytical profile as follows:

| Total dietary fiber | 30.0% |
| --- | --- |
| Soluble dietary fiber | 20.0% |
| Insoluble dietary fiber | 10.0% |
| Beta glucan | 16.0% |
| Protein | 15.0% |
| Moisture | 7.0% |
| Fat | 3.0% |
| Ash | 1.5% |

The yield of high soluble fiber fraction was 23% to 25% of the starting barley.

EXAMPLE 2

A covered barley feed variety was pearled 38% to remove the hull and bran layers from the kernels. The pearled barley contained 8% soluble dietary fiber and 6% insoluble dietary fiber. The pearled barley was rollermilled, pinmilled, and air classified as described in Example 1, resulting in a soluble dietary fiber level of 20%. The yield of coarse fraction was 22% to 23% of the starting covered barley.

EXAMPLE 3

Whole, waxy barley containing 6% to 7% soluble dietary fiber and 6% to 7% insoluble dietary fiber is ground to a coarse flour using three sets of rollermills equipped with corrugated rolls. The whole barley feed rate to the rolls is 950 pounds per hour. The flour is sifted through a U.S. #25 sieve (707 microns) and the overs are recirculated through the process.

The whole barley flour is delivered to a commercial size pinmill at a feed rate of 1634 pounds per hour. The flour is pinmilled at a pinmill speed setting of 190 meters per second to reduce the flour particles to an average particle size of 95 microns with a particle size distribution ranging from 5 to 200 microns.

The pinmilled flour is separated by air classification into two fractions above and below a specified particle size of 56 microns. The coarse fraction is characterized by having a fiber analytical profile as follows:

| Total dietary fiber | 32% to 35% |
| --- | --- |
| Soluble dietary fiber | 15% to 18% |
| Insoluble dietary fiber | 15% to 18% |
| Beta glucan | 12% to 15% |

The yield of coarse fraction is 30% to 35%.

EXAMPLE 4

A covered barley feed variety is pearled 25% to remove the hulls, but not the bran layers, from the kernels. The hulled, pearled barley is ground to a fine flour by rollermilling with three sets of corrugated rolls set in a series and sifted through a U.S. #30 sieve (595 microns). The overs are recirculated through the milling process. The resulting barley flour contains 7% soluble dietary fiber and 7% insoluble dietary fiber.

The barley flour is delivered to a commercial size pinmill at a feed rate of 1820 pounds per hour and pinmilled at a pinmill speed setting of 170 meters per second. The pinmilled flour is separated by air classification into two fractions above and below a specified particle size range of 42 microns. The coarse fraction is characterized by having a fiber analytical profile as follows:

| Total dietary fiber | 30% to 40% |
|---|---|
| Soluble dietary fiber | 15% to 20% |
| Insoluble dietary fiber | 15% to 20% |
| Beta glucan | 12% to 17% |

The yield of coarse fraction is 24% to 27% of the starting covered barley.

EXAMPLE 5

A high protein, waxy barley containing 18% soluble dietary fiber is pearled to remove 18% to 20% of the outer bran layers from the kernels. The pearled barley contains 22% to 24% soluble dietary fiber. The pearled barley is then rollermilled, pinmilled, and air classified as described in Example 4, resulting in a coarse fraction containing 1.2×–3× the starting barley soluble dietary fiber level. The yield of coarse fraction is 60% to 70%.

What is claimed is:

1. A method for preparing a barley four fraction having a concentrated level of soluble dietary fiber, consisting essentially of the steps of:
  A. milling barley having a native soluble dietary fiber content to form a course barley flour having a particle size such that about 90% is less than 600 microns and greater than 50% larger than 200 microns;
  B. size reducing without shearing the coarse barley flour in a single step to form a fine barley flour having a particle size such that 30% to 80% of the fine barley flour is less than about 50 microns;
  C. classifying the fine barley flour employing a screen setting ranging from about 28 to 65 microns into a first, minor barley flour fraction of a larger particle size having a concentrated soluble dietary fiber content at least 1.2 to 5× the native concentration and a second, major barley flour fraction of a smaller particle size having a reduced soluble dietary fiber content; and
  D. separately recovering the first and second barley flour fractions.

2. The method of claim 1 wherein the barley flour is a 70% to 90% barley extraction flour.

3. The method of claim 2 wherein the coarse barley flour is 80% barley extraction flour.

4. The method of claim 2 wherein the coarse barley flour has a native soluble dietary fiber content at least 6% by weight.

5. The method of claim 4 wherein no more than 70% of the size fine barley flour is less than 30 microns in size.

6. The method of claim 5 wherein in Step B, the coarse barley flour is pinmilled.

7. The method of claim 6 wherein in Step B, the barley flour size reduction step comprises pinmilling the barley flour at a pinmill tip speed of about 140–200 m/s.

8. The method of claim 7 wherein in Step C, the fine barley flour is air classified using a 35–50 micron screen.

9. The method of claim 8 wherein the air classification separation step is carried out at air classifier settings corresponding to 48 to 56 microns in particle size and wherein in Step A the barley is dry.

10. The method of claim 7 wherein the first minor barley flour fraction has the following composition:

| Total dietary fiber | 20% to 50% |
|---|---|
| Soluble dietary fiber | 10% to 35% |
| Insoluble dietary fiber | 5% to 25% |
| Starch | 20% to 45% |
| Protein | 14% to 20% |

* * * * *